(12) United States Patent
Lin et al.

(10) Patent No.: US 12,126,247 B2
(45) Date of Patent: Oct. 22, 2024

(54) BI-DIRECTIONAL DC/DC CONVERTER, CONTROL METHOD AND APPARATUS THEREOF, AND STORAGE MEDIUM

(71) Applicant: CONTEMPORARY AMPEREX TECHNOLOGY (HONG KONG) LIMITED, Hong Kong (CN)

(72) Inventors: Longzhen Lin, Ningde (CN); Yu Yan, Ningde (CN); Jinfeng Gao, Ningde (CN); Wei Zhang, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 225 days.

(21) Appl. No.: 17/884,561

(22) Filed: Aug. 9, 2022

(65) Prior Publication Data

US 2022/0385165 A1 Dec. 1, 2022

Related U.S. Application Data

(63) Continuation of application No. PCT/CN2021/139739, filed on Dec. 20, 2021.

(30) Foreign Application Priority Data

Mar. 16, 2021 (CN) .......................... 202110283689.3

(51) Int. Cl.
*H02M 3/157* (2006.01)
*H02M 1/00* (2006.01)
(Continued)

(52) U.S. Cl.
CPC ....... *H02M 1/0025* (2021.05); *H02M 1/0012* (2021.05); *H02M 3/01* (2021.05); *H02M 3/157* (2013.01); *H02M 3/28* (2013.01)

(58) Field of Classification Search
CPC .... H02M 1/0025; H02M 1/0012; H02M 3/01; H02M 3/157; H02M 3/28; H02M 3/158; Y02B 70/10
See application file for complete search history.

(56) References Cited

U.S. PATENT DOCUMENTS 8,036,000 B2  10/2011 Ying et al.
11,522,464 B2 * 12/2022 Mayell ............... H02M 3/33523
(Continued)

FOREIGN PATENT DOCUMENTS

CN    101976965 A    2/2011
CN    204068709 U    12/2014
(Continued)

OTHER PUBLICATIONS

The China National Intellectual Property Administration (CNIPA) The First Office Action for Chinese Application 202110283689.3 Jun. 17, 2023 16 Pages (With Translation).
(Continued)

*Primary Examiner* — Thienvu V Tran
*Assistant Examiner* — Yahveh Comas Torres
(74) *Attorney, Agent, or Firm* — ANOVA LAW GROUP, PLLC

(57) ABSTRACT

A control method for a bi-directional DC/DC converter. A source terminal transmits electric energy to a destination terminal sequentially through a first rectifier module and a second rectifier module of the converter. The method includes obtaining a first voltage value output by the first rectifier module in a current control cycle, obtaining a second voltage value output by the second rectifier module in the current control cycle, calculating a theoretical voltage control quantity of the bi-directional DC/DC converter in the current control cycle based on a preset reference voltage value and the second voltage value, and setting an actual
(Continued)

output voltage of the bi-directional DC/DC converter in a next control cycle based on the theoretical voltage control quantity and the first voltage value.

19 Claims, 3 Drawing Sheets

(51) Int. Cl.
  *H02M 3/00* (2006.01)
  *H02M 3/28* (2006.01)

(56) References Cited

U.S. PATENT DOCUMENTS

| | | | | |
|---|---|---|---|---|
| 2008/0247194 A1* | 10/2008 | Ying | ............... | H02M 3/3376 363/21.02 |
| 2020/0195160 A1* | 6/2020 | Mayell | ............ | H02M 3/33523 |
| 2021/0028712 A1* | 1/2021 | Yu | .................. | H02M 3/33584 |

FOREIGN PATENT DOCUMENTS

| | | |
|---|---|---|
| CN | 204615654 U | 9/2015 |
| CN | 105871215 A | 8/2016 |
| CN | 106533204 A | 3/2017 |
| CN | 109039083 A | 12/2018 |
| CN | 109586580 A | 4/2019 |
| CN | 110838793 A | 2/2020 |
| CN | 110855149 A | 2/2020 |
| CN | 111148658 A | 5/2020 |
| CN | 112087063 A | 12/2020 |
| CN | 112187058 A | 1/2021 |
| JP | 2019088171 A | 6/2019 |
| JP | 2020096519 A | 6/2020 |
| JP | 2020108260 A | 7/2020 |
| KR | 102177142 B1 | 11/2020 |
| KR | 1020210023038 A | 3/2021 |
| WO | 2017213029 A1 | 12/2017 |
| WO | 2020158859 A1 | 8/2020 |

OTHER PUBLICATIONS

The European Patent Office (EPO) Extended Search Report for EP Application No. 21921637.1 Jul. 17, 2023 11 Pages.
Japan Patent Office (JPO) The Office Action For JP Application No. 2022-534291 Aug. 28, 2023 9 Pages (Translation Included).
Stanimir Valtchev et al., "An instantaneous regulation for the wired and wireless super-resonant converters".
Stanimir Valtchev et al., "Improved Strategy for an Instantaneous Super-Resonant Converter Regulation", 2010, pp. 631-638, 12th International Conference on Optimization of Electrical and Electronic Equipment.
The Korea Intellectual Property Office Request for the Submission of an Opinion for Application No. 10-2022-7018033 Jan. 8, 2024 12 Pages.
Kazuto Takagi, et al., Dynamic Control and Performance of a Dual-Active-Bridge DC-DC Converter, IEEE Transactions on Power Electronics, vol. 33, No. 9, Sep. 2018, p. 7858-7866.
Japan Patent Office (JPO) Decision to Grant a Patent For JP Application No. 2022-534291 Feb. 5, 2024 6 Pages (Translation Included).
The World Intellectual Property Organization (WIPO) International Search Report for PCT/CN2021/139739 Mar. 2, 2022 7 pages (with translation).

* cited by examiner

BI-DIRECTIONAL DC/DC CONVERTER, CONTROL METHOD AND APPARATUS THEREOF, AND STORAGE MEDIUM

CROSS-REFERENCE TO RELATED APPLICATIONS

This application is a continuation of International Application No. PCT/CN2021/139739, filed on Dec. 20, 2021, which claims priority to Chinese Patent Application 2021102836893, filed on Mar. 16, 2021 and entitled "BI-DIRECTIONAL DC/DC CONVERTER, CONTROL METHOD AND APPARATUS THEREOF, AND STORAGE MEDIUM", the entire contents of both of which are incorporated herein by reference.

TECHNICAL FIELD

This application relates to the field of battery charging technologies, and in particular, to a bi-directional DC/DC converter, a control method and apparatus thereof, and a storage medium.

BACKGROUND

A CLLLC isolated bi-directional DC/DC converter is widely used in a vehicle due to its good soft switching characteristics and high efficiency. A mainstream modulation strategy for this topology is frequency modulation+PI control. However, for this control strategy, PI parameters are required to be adjusted a plurality of times depending on different working conditions and load conditions, and dynamic performance is poor; and frequency hopping occurs on a control quantity, namely switching frequency, output by a PI controller when a load switches in a large range. Moreover, due to an excessive quantity of passive components and complex circuit modes, it is difficult to accurately establish a mathematical model for describing circuit dynamics in the existing control strategy, and there is a relatively large error.

SUMMARY

The embodiments of this application aim to provide a bidirectional DC/DC converter, a control method and an apparatus thereof, and a storage medium, which may reduce a voltage tracking error in a next control cycle. Moreover, because PI parameters are not required for control, an output theoretical voltage control quantity is no longer a frequency but a switching signal, which may avoid frequency hopping during switching.

According to a first aspect, an embodiment of this application provides a control method of a bi-directional DC/DC converter. A source terminal transmits electric energy to a destination terminal sequentially through a first rectifier module and a rectifier module of the bi-directional DC/DC converter. The method includes: obtaining a first voltage value output by a first rectifier module in a current control cycle; obtaining a second voltage value output by a second rectifier module in the current control cycle; calculating a theoretical voltage control quantity of the bi-directional DC/DC converter in the current control cycle based on a preset reference voltage value and the second voltage value; and setting an actual output voltage of the bi-directional DC/DC converter in a next control cycle based on the theoretical voltage control quantity and the first voltage value.

According to the control method of the bi-directional DC/DC converter provided in the embodiment of this application, a theoretical voltage control quantity that makes a voltage tracking error in a next control cycle minimized or relatively small is calculated based on a preset reference voltage value and the second voltage value, and then an actual output voltage of the bi-directional DC/DC converter in next power supply is regulated in combination with the theoretical voltage control quantity and a first voltage value output by a first rectifier module, thus achieving a beneficial effect of reducing the voltage tracking error in the next control cycle. Moreover, because PI parameters are not required for control, an output theoretical voltage control quantity is no longer a frequency but a switching signal, which may avoid frequency hopping during switching.

In some embodiments, the setting an actual output voltage of the bi-directional DC/DC converter in a next control cycle based on the theoretical voltage control quantity and the first voltage value includes: generating a switching signal based on the theoretical voltage control quantity and the first voltage value to control an actual output voltage of the bi-directional DC/DC converter in the next control cycle.

In some embodiments, the generating a switching signal based on the theoretical voltage control quantity and the first voltage value includes: comparing the theoretical voltage control quantity with the first voltage value to generate the switching signal, where the switching signal is used to be sent to a control terminal of the first rectifier module to control a first voltage value output by the rectifier module in the next control cycle, and then further to control an actual output voltage of the bi-directional DC/DC converter in the next control cycle. In the embodiments of this application, a switching signal is generated to control an output voltage of the first rectifier module in the next control cycle, and then further to control an actual output voltage of the bi-directional DC/DC converter in the next control cycle, which may reduce a tracking error in the next control cycle.

In some embodiments, the setting an actual output voltage of the bi-directional DC/DC converter in a next control cycle based on the theoretical voltage control quantity and the first voltage value includes: outputting the voltage control quantity and the first voltage value to a hysteresis comparator for comparison to generate a switching signal. The switching signal is used to be output to a control terminal of the first rectifier module to regulate a first voltage value of the first rectifier module in the next control cycle, and then further to control an actual output voltage of the bi-directional DC/DC converter in the next control cycle. In comparison with the existing technologies, in the embodiments of this application, no switching frequency information is required to be generated or then converted into a corresponding switching signal, so that fewer oscillators may be used, costs may be reduced, and efficiency is improved.

In some embodiments, the first rectifier module includes a first bridge arm and a second bridge arm. The setting an actual output voltage of the bi-directional DC/DC converter in a next control cycle based on the theoretical voltage control quantity and the first voltage value includes: comparing the voltage control quantity with the first voltage value to obtain a first switching signal and a second switching signal for the next control cycle, where the first switching signal is used to control switch-on and switch-off of an upper bridge arm of the first bridge arm and a lower bridge arm of the second bridge arm, and the second switching signal is used to control switch-on and switch-off of a lower bridge arm of the first bridge arm and an upper bridge arm of the second bridge arm.

In some embodiments, when the first voltage value is in a first interval in the current control cycle, in the next control cycle, the upper bridge arm of the first bridge arm and the lower bridge arm of the second bridge arm are switched on, and the lower bridge arm of the first bridge arm and the upper bridge arm of the second bridge arm are switched off. When the first voltage value is in a second interval in the current control cycle, in the next control cycle, the upper bridge arm of the first bridge arm and the lower bridge arm of the second bridge arm are switched off, and the lower bridge arm of the first bridge arm and the upper bridge arm of the second bridge arm are switched on.

In some embodiments, the first voltage value includes a valley value $V_{11}$ and a peak value $V_{22}$ in each control cycle. The first interval is a combination of $(-U_{c1\_off}, V_{11}]$ and $[V_{11}, U_{c1\_off})$; and the second interval is a combination of $[V_{22}, -U_{c1\_off})$ and $(U_{c1\_off}, V_{22}]$, and $U_{c1\_off}$ is a theoretical voltage control quantity.

In some embodiments, the calculating a theoretical voltage control quantity of the bi-directional DC/DC converter in the current control cycle based on the preset reference voltage value and the second voltage value includes: obtaining a first relation between a voltage control quantity of the current control cycle and a voltage control quantity of the next control cycle; setting an evaluation function of a tracking error based on the preset reference voltage and a voltage control quantity of the next control cycle; and calculating the theoretical voltage control quantity of the bi-directional DC/DC converter in the current control cycle based on a preset reference voltage value, the second voltage value, the first relation, and the evaluation function.

In some embodiments, the calculating the theoretical voltage control quantity of the bi-directional DC/DC converter in the current control cycle based on a preset reference voltage value, the second voltage value, the first relation, and the evaluation function includes: obtaining a preset calculation formula based on the first relation and the evaluation function; and calculating, based on the preset calculation formula, the second voltage value, and the preset reference voltage, a theoretical voltage control quantity that makes a voltage tracking error of the bi-directional DC/DC converter in the next control cycle minimized.

In some embodiments, the calculating a theoretical voltage control quantity of the bi-directional DC/DC converter in the current control cycle based on a preset reference voltage value and the second voltage value includes: calculating, according to the formula $U_{c1\_off}(k)=[C_1 U_0(k) U_{ref} - C_1 U_0^2(k)*(1-T_s/R_L C_1) - 4 C_{oss} V_{in}^2]/(4 C_1 V_{in})$, a theoretical voltage control quantity that makes a voltage tracking error of the bi-directional DC/DC converter in the next control cycle is minimized. $U_{c1\_off}(k)$ is a theoretical voltage control quantity in the current control cycle, $C_1$ is a capacitance value of a first capacitor, and the first rectifier module is connected to the second rectifier module through a first capacitor. $U_0(k)$ is a second voltage value in the current control cycle, $U_{ref}$ is a reference voltage value, $T_s$ is a duration of the control cycle, $V_{in}$ is a voltage value of the direct current voltage, $C_{oss}$ is a parasitic capacitance value of a first switching transistor, a second switching transistor, a third switching transistor and a fourth switching transistor, and $R_L$ is a resistance value of an output load resistor of the second rectifier module. The second switching transistor and the third switching transistor form the first bridge arm, and the first switching transistor and the fourth switching transistor form a second bridge arm.

According to a second aspect, an embodiment of this application further provides a bi-directional DC/DC converter, including: a first rectifier module, configured to convert a first direct current into a first alternating current for output; a transformer, whose primary side is connected to the first rectifier module through a first capacitor to receive the first alternating current, and whose secondary side outputs a second alternating current; a second rectifier module, configured to be connected to the secondary side to rectify the second alternating current and output a second direct current obtained through rectification; and a control module, configured to be connected to each of an output terminal of the second rectifier module and an input terminal of the first capacitor to obtain a first voltage value of a first alternating current output by the first rectifier module and a second voltage value of a second direct current in the current control cycle; and configured to calculate a theoretical voltage control quantity of the bi-directional DC/DC converter in the current control cycle based on a preset reference voltage value and the second voltage value, to reduce a voltage tracking error in the next control cycle, and set an actual output voltage of the second rectifier module in the next control cycle based on the theoretical voltage control quantity and the first voltage value.

According to the bi-directional DC/DC converter provided in the embodiments of this application, a theoretical voltage control quantity that makes a voltage tracking error in a next control cycle minimized or relatively small is calculated based on a preset reference voltage value and the second voltage value, and then an actual output voltage of the bi-directional DC/DC converter in next power supply is regulated in combination with the theoretical voltage control quantity and a first voltage value output by a first rectifier module, thus achieving a beneficial effect of reducing a voltage tracking error in the next control cycle. Moreover, because PI parameters are not required for control, an output theoretical voltage control quantity is no longer a frequency but a switching signal, which may avoid frequency hopping during switching. In addition, in comparison with the existing technologies, no switching frequency information is required to be generated or then converted into a corresponding switching signal, so that fewer oscillators may be used, costs may be reduced, and efficiency is improved.

In some embodiments, the control module includes: a first sampling unit, configured to be connected to the first capacitor and the first rectifier module to obtain a first voltage value; a second sampling unit, configured to be connected to the output terminal of the second rectifier module to obtain a second voltage value; a predictive controller, configured to be connected to the second sampling unit to calculate the theoretical voltage control quantity in the current control cycle based on the reference voltage value and the second voltage value, so as to reduce the voltage tracking error in the next control cycle; and a comparator unit, configured to be connected to the first sampling unit and the predictive controller to compare the theoretical voltage control quantity with the first voltage value, generate a switching signal based on the comparison result, and send the switching signal to a control terminal of the first rectifier module.

In some embodiments, the comparator unit is a hysteresis comparator.

In some embodiments, the first rectifier module includes: a first bridge arm and a second bridge arm. The first bridge arm includes a first switching transistor and a third switching transistor. The second bridge arm includes a second switching transistor and a fourth switching transistor. An input terminal of the first switching transistor and an input terminal of the second switching transistor are connected for connecting a positive electrode of a source terminal. An output terminal of the third switching transistor and an output terminal of the fourth switching transistor are connected for connecting a negative electrode of the source terminal. An output terminal of the first switching transistor and an input terminal of the third switching transistor are connected and then connected to a positive terminal on a primary side of the transformer through the first capacitor. An output terminal of the second switching transistor and an input terminal of the fourth switching transistor are connected and then connected to a negative terminal on the primary side of the transformer. The control module is connected to a control terminal of each of the first switching transistor, the second switching transistor, the third switching transistor, and the fourth switching transistor.

In some embodiments, when the first voltage value is in a first interval in the current control cycle, in the next control cycle, the first switching transistor and the fourth switching transistor are switched on, and the second switching transistor and the third switching transistor are switched off. When the first voltage value is in a second interval in the current control cycle, in the next control cycle, the first switching transistor and the fourth switching transistor are switched off, and the second switching transistor and the third switching transistor are switched on.

In some embodiments, the first voltage value includes a valley value $V_{11}$ and a peak value $V_{22}$ in each control cycle. The first interval is a combination of $(-U_{c1\_off}, V_{11}]$ and $[V_{11}, U_{c1\_off})$; and the second interval is a combination of $[V_{22}, -U_{c1\_off})$ and $(U_{c1\_off}, V_{22}]$, and $U_{c1\_off}$ is a theoretical voltage control quantity.

In some embodiments, the theoretical voltage control quantity meets the following relational expression: $U_{c1\_off}(k)=[C_1U_0(k)\sqrt{U_{ref}-C_1U_0^2(k)*(1-T_s/R_LC_1)-4C_{oss}V_{in}^2}]/(4C_1V_{in})$, which is used to calculate a theoretical voltage control quantity in the current control cycle that makes a voltage tracking error of the bi-directional DC/DC converter in the next control cycle minimized. $U_{c1\_off}(k)$ is a theoretical voltage control quantity in the current control cycle, $C_1$ is a capacitance value of a first capacitor, and the first rectifier module is connected to the second rectifier module through a first capacitor. $U_0(k)$ is a second voltage value in the current control cycle, $U_{ref}$ is a reference voltage value, $T_s$ is a duration of the control cycle, $V_{in}$ is a voltage value of the direct current voltage, $C_{oss}$ is a parasitic capacitance value of a first switching transistor, a second switching transistor, a third switching transistor, and a fourth switching transistor, and $R_L$ is a resistance value of an output load resistor of the second rectifier module.

According to a third aspect, an embodiment of this application further provides a control apparatus for a bi-directional DC/DC converter. A source terminal transmits electric energy to a destination terminal sequentially through a first rectifier module and a second rectifier module of the bi-directional DC/DC converter, and the apparatus includes: a first obtaining module, configured to obtain a first voltage value output by a first rectifier module in a current control cycle; a second obtaining module, configured to obtain a second voltage value output by a second rectifier module in the current control cycle; a calculation module, configured to calculate theoretical voltage control quantity of the bi-directional DC/DC converter in the current control cycle based on a preset reference voltage value and the second voltage value, to reduce a voltage tracking error in a next control cycle; and a control module, configured to set an actual output voltage of the bi-directional DC/DC converter in the next control cycle based on the theoretical voltage control quantity and the first voltage value.

According to a fourth aspect, an embodiment of this application further provides a storage medium on which a computer program is stored, and when the computer program is executed by a processor, the method according to any implementation of the first aspect is implemented.

The above description is simply an overview of the technical solutions of this application. To understand the technical means of this application more clearly, this application can be implemented in accordance with the contents of the specification, and to present the above and other purposes, features and advantages of this application more evidently and understandably, the specific implementations of this application are given below.

BRIEF DESCRIPTION OF DRAWINGS

After reading the detailed description of optimal implementations below, various other advantages and benefits will become clear to a person of ordinary skill in the art. The drawings are simply intended for the purpose of showing the optimal implementations, and are not considered to be a limitation on this application. In addition, in all the accompanying drawings, a same reference symbol is used to represent a same part.

DETAILED DESCRIPTION OF EMBODIMENTS

Figure 1:
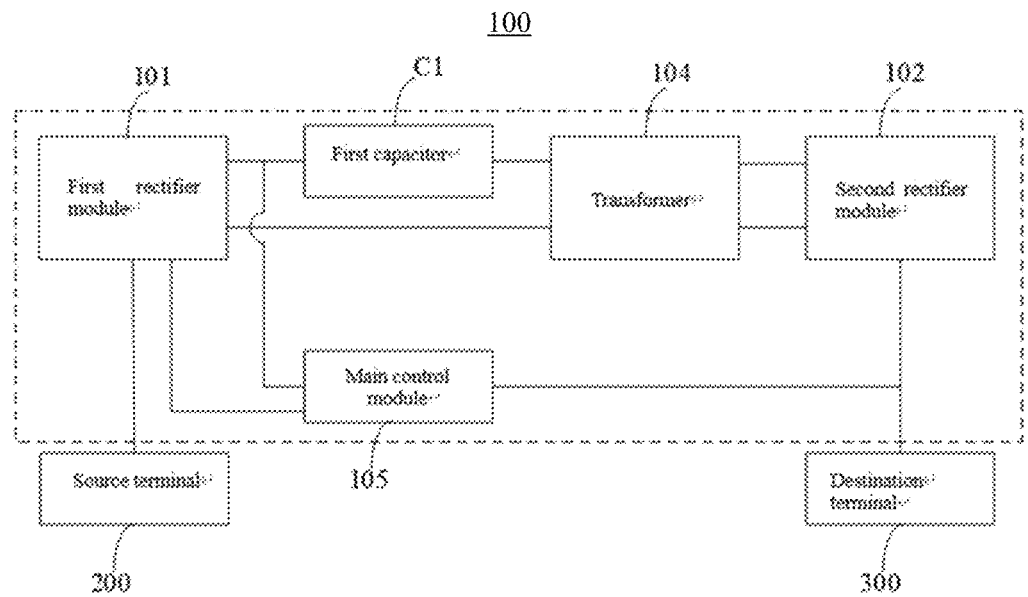
FIG. 1 is a first schematic structural diagram of a bi-directional DC/DC converter in the embodiments of this application.

The following gives a more detailed description of embodiments under the technical solutions of this application with reference to drawings. The following embodiments are simply intended to describe the technical solutions of this application more clearly, and are therefore used only as examples but are not intended to limit the protection scope of this application.

Unless otherwise defined, all technical and scientific terms used herein have the same meaning as those normally understood by a person of skill in the art of this application. The terms used herein are for the purpose of describing specific embodiments and are not intended to limit this application. The terms "include" and "have" and any variations thereof in the specification, claims and the accompanying drawings of this application are intended to cover a non-exclusive inclusion.

In the description of the embodiments of this application, the technical terms such as "first" and "second" are simply used to distinguish between different objects, and can neither be understood as indicating or implying relative importance, nor implying the quantity, specific order or primary and secondary relation of the indicated technical features. In the description of the embodiments of this application, "a plurality of" means two or more, unless otherwise expressly and specifically defined.

The "embodiment" referred to herein means at least one embodiment that may be included in this application with reference to the specific characteristics, structures or features described in the embodiment. The phrase at various positions in the specification neither does necessarily refer to the same embodiment, nor are they independent or alternative embodiments mutually exclusive with other embodiments. It is understood explicitly and implicitly by a person of skill in the art that the embodiments described herein can be combined with other embodiments.

In the description of the embodiments of this application, the term "and/or" simply describes the association relation of the associated objects, indicating that there can be three relations, such as A and/or B, indicating that A exists alone, A and B exist simultaneously, and B exists alone. In addition, the character "/" herein generally indicates an "or" relation between associated objects.

In the description of the embodiments of this application, the term "a plurality of" means more than two (including two). Similarly, "a plurality of groups" means more than two groups (including two groups), and "a plurality of pieces" means more than two pieces (including two pieces).

In the description of the embodiments of this application, a direction or a position relation indicated by the technical terms "center", "longitudinal", "lateral", "length", "width", "thickness", "upper", "lower", "front", "rear", "left", "right", "vertical", "horizontal", "top", "bottom", "inside", "outside", "clockwise", "counter clockwise", "axial", "radial", and "circumferential" are based on the location or position shown in the drawings for the convenience and brevity of the description of embodiments of this application, but do not indicate or imply that the apparatus or component referred to may be located or constructed and operated in the specified direction, and therefore, such terms are not constructed as a limitation on the embodiments of this application.

In the description of the embodiments of this application, unless otherwise expressly specified and defined, the technical terms such as "install", "concatenate", "connect", and "fix" are understood in a broad sense. For example, a "connection" may be a fixed connection, a detachable connection, or an integrated connection; a mechanical connection or an electrical connection; a direct connection, or an indirect connection implemented through an intermediary, and may be an internal conduct of two components or an interaction of two components. A person of ordinary skill in the art may understand the specific meanings of the terms in the embodiments of this application according to specific situations.

FIG. 1 is an architecture diagram of a bi-directional DC/DC converter in the embodiments of this application. The bi-directional DC/DC converter 100 includes a first rectifier module 101, a second rectifier module 102, a first capacitor C1, a transformer 104, and a main control module 105. The first rectifier module 101, the first capacitor C1, the transformer 104, and the second rectifier module 102 are connected in sequence. The main control module 105 is connected to the node between the first capacitor and the first rectifier module 101, the main control module 105 is connected to the output terminal of the second rectifier module 102, and the main control module 105 is further connected to the control terminal of the first rectifier module 101. A source terminal 200 is connected to the input terminal of the first rectifier module 101, and a destination terminal 300 is connected to the output terminal of the second rectifier module 102. The source terminal 200 transmits electric energy to the destination terminal 300 through the bi-directional DC/DC converter 100.

The source terminal 200 may be a DC power supply, and the destination terminal 300 may be a battery pack to be charged.

The first rectifier module 101 is configured to receive a first direct current input by the source terminal 200 and to convert the first direct current into a first alternating current for output. The first alternating current is transmitted to the transformer 104 through the first capacitor C1, and the first alternating current is input to the second rectifier module 102 after voltage rising or dropping. The first alternating current is rectified by the second rectifier module 102 to output a corresponding second direct current, and the second direct current is input to the destination terminal.

The main control module 105 is configured to: obtain a first voltage value of a first alternating current and a second voltage value of a second direct current that are output by a first rectifier module in a current control cycle; calculate a theoretical voltage control quantity of the bi-directional DC/DC converter in the current control cycle based on a preset reference voltage value and the second voltage value, to reduce a voltage tracking error in a next control cycle; and set, based on the theoretical voltage control quantity and the first voltage value, an actual output voltage of the second rectifier module 102 in the next control cycle, namely, an actual output voltage of the DC/DC converter in the next control cycle.

The bi-directional DC/DC converter is described in detail in combination with a circuit diagram below.

Figure 2:
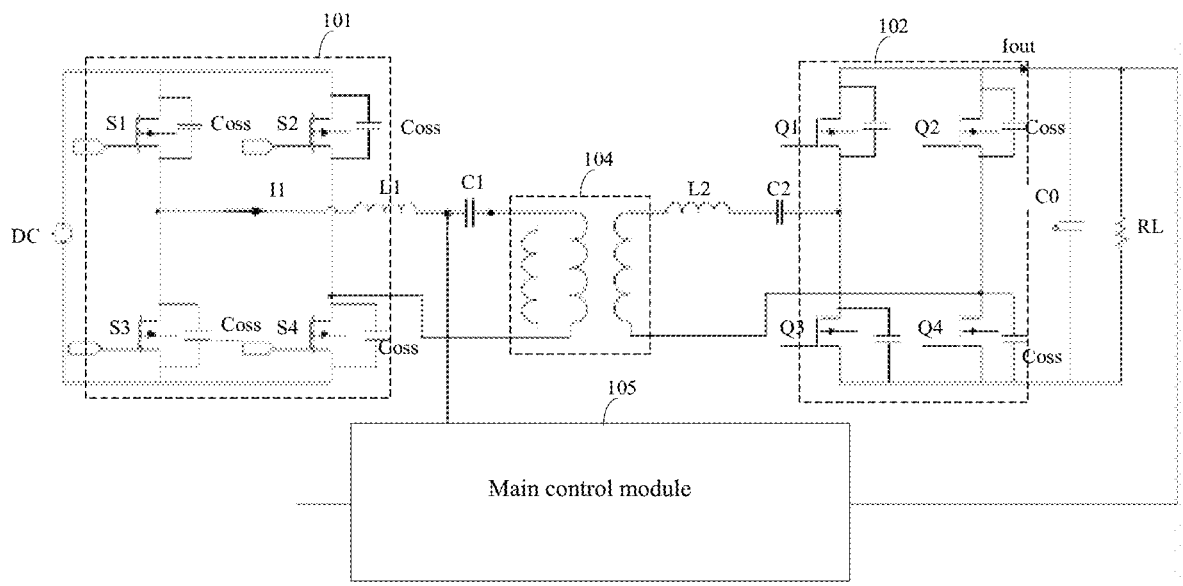
FIG. 2 is a second schematic structural diagram of a bi-directional DC/DC converter in the embodiments of this application.

As shown in FIG. 2, the first rectifier module 101 includes a first bridge arm and a second bridge arm. The first bridge arm includes a first switching transistor S1 and a third switching transistor S3. The first switching transistor S1 is an upper bridge arm of the first bridge arm, and the third switching transistor S3 is a lower bridge arm of the first bridge arm. The second bridge arm includes a second switching transistor S2 and a fourth switching transistor S4. The second switching transistor S2 is an upper bridge arm of the second bridge arm, and the fourth switching transistor S4 is a lower bridge arm of the second bridge arm. An input terminal of the first switching transistor S1 and an input terminal of the second switching transistor S2 are connected, and used to connect a positive electrode of the source terminal. An output terminal of the third switching transistor S3 and an output terminal of the fourth switching transistor S4 are connected, and used to connect a negative electrode of the source terminal. An output terminal of the first switching transistor S1 and an input terminal of the third switching transistor S3 are connected, and further connected to a positive terminal on a primary side of the transformer 104 through the first capacitor C1. An output terminal of the second switching transistor S2 and an input terminal of the fourth switching transistor S4 are connected, and further connected to a negative terminal on the primary side of the transformer 104. The control module 105 is connected to each of control terminals of the first switching transistor S1, the second switching transistor S2, the third switching transistor S3, and the fourth switching transistor S4.

In this embodiment, the first switching transistor S1, the second switching transistor S2, the third switching transistor S3, and the fourth switching transistor S4 are all PMOS transistors. Of course, an NMOS transistor or another type of switching transistor may alternatively be used. The first switching transistor S1, the second switching transistor S2, the third switching transistor S3, and the fourth switching transistor S4 are all parasitic capacitors of PMOS transistor, which are all marked with $C_{oss}$. A switching state of the first switching transistor S1 is the same as that of the fourth switching transistor S4, a switching state of the second switching transistor S2 is the same as that of the third switching transistor S3, and the switching states of the first switching transistor S1 and the second switching transistor S2 are reversed.

In some embodiments, the second rectifier module 102 may include a fifth switching transistor Q1, a sixth switching transistor Q2, a seventh switching transistor Q3, and an eighth switching transistor Q4. The fifth switching transistor Q1 and the seventh switching transistor Q3 form a third bridge arm of the second rectifier module 102, and the sixth switching transistor Q2 and the eighth switching transistor Q4 form a fourth bridge arm of the second rectifier module 102.

An input terminal of the fifth switching transistor Q1 and an input terminal of the sixth switching transistor Q2 are connected, and further connected to a positive electrode of a destination terminal. An output terminal of the fifth switching transistor Q1 and an input terminal of the seventh switching transistor Q3 are connected, and further connected to a positive terminal on a secondary side of the transformer 104. An output terminal of the seventh switching transistor Q3 and an output terminal of the eighth switching transistor Q4 are connected, and further connected to a negative electrode of the destination terminal. An output terminal of the sixth switching transistor Q2 and an input terminal of the eighth switching transistor Q4 are connected, and further connected to a negative terminal on the secondary side of the transformer 104.

The fifth switching transistor Q1, the sixth switching transistor Q2, the seventh switching transistor Q3, and the eighth switching transistor Q4 are all PMOS transistors, which are equivalent to diodes. Parasitic capacitance of the fifth switching transistor Q1, the sixth switching transistor Q2, the seventh switching transistor Q3, and the eighth switching transistor Q4 is $C_{oss}$.

In some embodiments, the bi-directional DC/DC converter further includes a first inductor L1, a second inductor L2, a second capacitor C2, a filter capacitor C0, and an output load resistor RL.

One terminal of the first inductor L1 is connected to a common node between the first switching transistor and the third switching transistor, the other terminal of the first inductor L1 is connected to one terminal of the first capacitor C1, and the other terminal of the first capacitor C1 is connected to a positive terminal on a primary side of the transformer 104. The first inductor L1 and the first capacitor C1 may form an LC resonant circuit.

One terminal of the second inductor L2 is connected to the positive terminal on the secondary side of the transformer 104, the other terminal of the second inductor L2 is connected to one terminal of the second capacitor C2, and the other terminal of the second capacitor C2 is connected to a common node between the fifth switching transistor and the seventh switching transistor. The second inductor L2 and the second capacitor C2 may form an LC resonant circuit.

In some embodiments, all functions of the main control module 105 may be integrated into a chip, and all functions of the main control module 105 are implemented based on a computer program. For example, all functions may be integrated into a battery management system.

Figure 3:
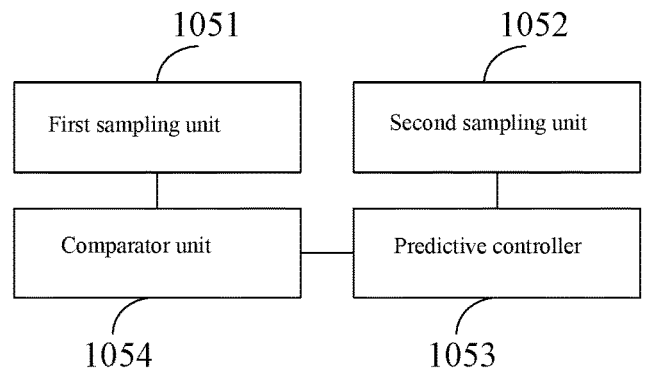
FIG. 3 is a schematic structural diagram of a main control module of a bi-directional DC/DC converter in the embodiments of this application.

In some other embodiments, as shown in FIG. 3, the main control module 105 may include: a first sampling unit 1051, a second sampling unit 1052, a predictive controller 1053, and a comparator unit 1054.

The first sampling unit 1051 is connected to a common node between the first capacitor C1 and the first rectifier module 101 to obtain a first voltage value. The second sampling unit 1052 is connected to an output terminal of the second rectifier module 102 to obtain a second voltage value. The predictive controller 1053 is connected to the second sampling unit 1052 to calculate a theoretical voltage control quantity in a current control cycle based on the reference voltage value and the second voltage value, so as to reduce a voltage tracking error in a next control cycle. The comparator unit 1054 is connected to the first sampling unit 1051 and the predictive controller 1053 to compare the theoretical voltage control quantity with the first voltage value, so as to generate a switching signal based on the comparison results and send the switching signal to the control terminal of the first rectifier module 101.

The first sampling unit 1051 may be a common single sampling circuit, for example, a voltage divider sampling circuit combined with a corresponding A/D converter. The voltage divider sampling circuit detects an input voltage of the first capacitor C1, and then converts the input voltage into a digital signal through the A/D converter to obtain a first voltage value, which is certainly not limited thereto.

The second sampling unit 1052 may be a common single sampling circuit, for example, a voltage divider sampling circuit combined with a corresponding A/D converter. The voltage divider sampling circuit detects an output voltage of the second rectifier module 102, and then converts the output voltage into a digital signal through the A/D converter to obtain a second voltage value.

The predictive controller 1053 may be a chip, or functions of the predictive controller may be integrated into a battery management system in the form of a computer.

The predictive controller 1053 may use the following formula to calculate a theoretical voltage control quantity in a current control cycle that makes the voltage tracking error of the bi-directional DC/DC converter in the next control cycle minimized or relatively small:

$$U_{c1\_off}(k) = [C_1 U_0(k) U_{ref} - C_1 U_0^2(k) * (1 - T_S/R_L C1) - 4C_{oss} V_{in}^2]/(4C_1 V_{in}).$$

$U_{c1\_off}(k)$ is a theoretical voltage control quantity in the current control cycle, $C_1$ is a capacitance value of a first capacitor, and the first rectifier module is connected to the second rectifier module sequentially through a first capacitor and a transformer. $U_0(k)$ is a second voltage value in the current control cycle, $U_{ref}$ is a reference voltage value, $T_s$ is a duration of the control cycle, $V_{in}$ is a voltage value of a first direct current voltage, $C_{oss}$ is the parasitic capacitance value of a first switching transistor S1, a second switching transistor S2, a third switching transistor S3, and a fourth switching transistor S4, and RL is a resistance value of an output load resistor of the second rectifier module 102. The first switching transistor S1 and the third switching transistor S3 form the first bridge arm, and the second switching transistor S2 and the fourth switching transistor S4 form a second bridge arm.

The comparator unit 1054 may be a comparator, for example, a hysteresis comparator may be used. The switching signal may include a first switching signal and a second switching signal. The first switching signal is output to a control terminal of each of the first switching transistor and the fourth switching transistor, the second switching signal is output to a control terminal of each of the second switching transistor and the third switching transistor, and the first switching signal and the second switching signal are phase reversal signals.

Figure 4:
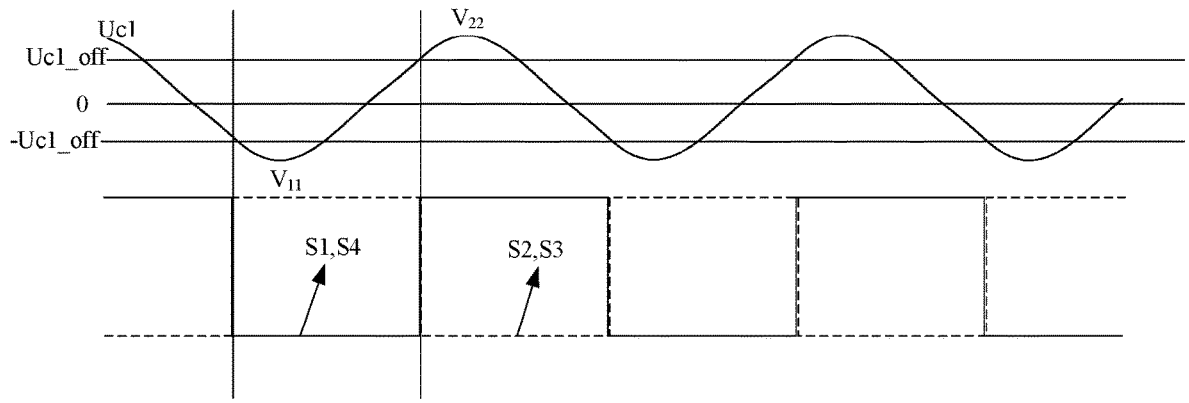
FIG. 4 is a waveform diagram of a bi-directional DC/DC converter in the embodiments of this application.

As shown in FIG. 4, when the first voltage value is in a first interval in a current control cycle, in the next control cycle, the upper bridge arm of the first bridge arm and the lower bridge arm of the second bridge arm are switched on (S1 and S4 are switched on), and the lower bridge arm of the first bridge arm and the upper bridge arm of the second bridge are switched off (S2 and S3 are switched off). When the first voltage value is in a second interval in the current control cycle, in the next control cycle, the upper bridge arm of the first bridge arm and the lower bridge arm of the second bridge arm are switched off (S1 and S4 are switched off), and the lower bridge arm of the first bridge arm and the upper bridge arm of the second bridge arm are switched on (S2 and S3 are switched on).

The first voltage value includes a valley value $V_{11}$ and a peak value $V_{22}$ in each control cycle. The first interval is a combination of $(-U_{c1\_off}, V_{11}]$ and $[V_{11}, U_{c1\_off})$; and the second interval is a combination of $[V_{22}, -U_{c1\_off})$ and $(U_{c1\_off}, V_{22}]$, and $U_{c1\_off}$ is a theoretical voltage control quantity. That is, as shown in FIG. 4, the first interval refers to an interval within which a change of the first voltage value is that the first voltage value decreases from $-U_{c1\_off}$ to $V_{11}$ and then increases to $U_{c1\_off}$, and the second interval refers to an interval within which a change of the first voltage value is that the first voltage value increases from $U_{c1\_off}$ to $V_{22}$ and then decreases to $-U_{c1\_off}$.

An average input current $I_{in}$ of the bi-directional DC/DC converter within a cycle $T_s$ may be expressed as follows:

$$I_{in}=(4C_1 U_{c1\_off}+8C_{oss}V_{in})/TS=4C_1 U_{c1\_off} f_S+8C_{oss}V_{in} f_S \quad (1)$$

where $f_S=1/T_S$.

Therefore, an input power $P_{in}$ may be expressed as follows:

$$P_{in}=(4C_1 U_{c1\_off} f_S+8C_{oss}V_{in} f_S)V_{in} \quad (2).$$

It is assumed that the transmission efficiency of the bi-directional DC/DC converter is 1, and an output power $P_{ou}$ meets the following expression:

$$P_{in}=P_{out};$$

In this case, an average output current $I_{out}$ of a resonant cavity (composed of a first inductor L1, a first capacitor C1, a transformer, a second inductor L2, and a second capacitor C2) within a control cycle may be expressed as follows:

$$I_{out}=P_{out}/U_0=(4C_1 U_{c1\_off} f_S V_{in}+8C_{oss}V_{in} f_S V_{in})/U0 \quad (3).$$

It can be learned that in Formula (3), all variables except $U_{c1\_off}$ are known, and thus a value of $I_{out}$ may be controlled by controlling $U_{c1\_off}$.

Differential modeling may be done for an RC circuit formed by an output load resistor RL of the second rectifier module in the next stage and a filter capacitor $C_0$:

$$C_0 dU_0/dt+U_0/R_L=I_{out} \quad (4),$$

where $R_L$ is a resistance value of the output load resistor RL, and $U_0$ is a second voltage value of a second direct current output by a second rectifier module.

The Euler forward method is used to expand Formula (4), then:

$$C_0 U_0(k+1)-U_0(k)/T_S+U_0(k)/R_L=I_{out}(k) \quad (5),$$

where K represents a control cycle of steady-state operation of the circuit, and (k+1) represents a next control cycle of the control cycle k. The Formula is expanded as follows:

$$U_0(k+1)=(1-T_S/R_L C_0)*U_0(k)+I_{out}(k)*T_S/C_0 \quad (6).$$

According to Formula (6), an output voltage in the next control cycle may be predicted in real time based on circuit parameters of the control cycle k, where $I_{out}(k)$ may be obtained according to Formula (3). Based on the above analysis, to implement a real-time tracking of an output voltage against a reference voltage $U_{ref}$ and minimize a tracking error, an optimized evaluation function is set as follows:

$$J_{opt}=\{U_0(k+1)-U_{ref}\}^2 \quad (7).$$

According to Formula (7), a control quantity that makes the voltage tracking error $J_{opt}$ in the next control cycle is minimized may be calculated, that is:

$$U_{c1\_off}(k)=[C_1 U_0(k) U_{ref}-C_1 U_0^2(k)*(1-T_S/R_L C1)-4C_{oss}V_{in}^2]/(4C_1 V_{in}).$$

According to the above Formula, a theoretical voltage control quantity in a current control cycle that makes the voltage tracking error in the next control cycle minimized may be calculated.

It can be learned from the above that, according to the bi-directional DC/DC converter provided in the embodiments of this application, a theoretical voltage control quantity that makes a voltage tracking error in a next control cycle minimized or relatively small is calculated based on a preset reference voltage value and the second voltage value, and then an actual output voltage of the bi-directional DC/DC converter in next power supply is regulated in combination with the theoretical voltage control quantity and a first voltage value output by a first rectifier module, so that a beneficial effect of reducing the voltage tracking error in the next control cycle is achieved and an extremely fast dynamic response may be received in all working conditions. Predictive control can avoid parameter setting smoothly, and a theoretical voltage control quantity is directly calculated in each control cycle. An output theoretical voltage control quantity is no longer a frequency but a switching signal, so that a pulse frequency modulator is not required to generate a corresponding switching signal, which may reduce a time delay and reduce costs of devices.

Figure 5:
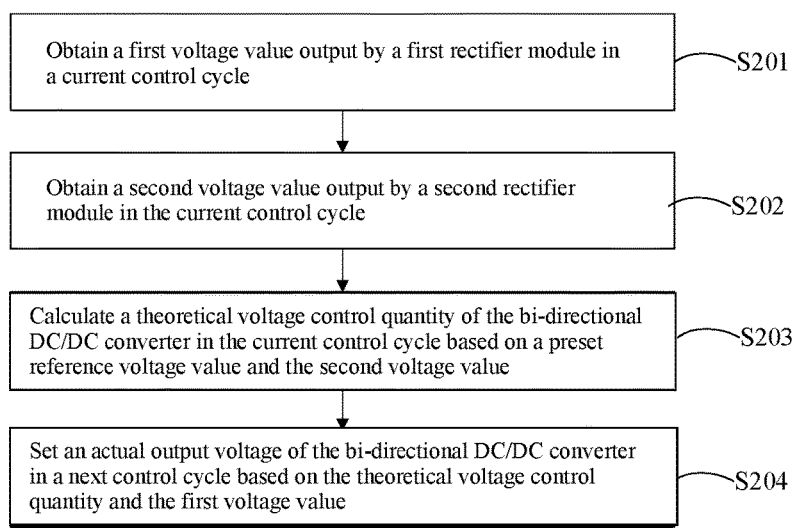
FIG. 5 is a flowchart of a control method of a bi-directional DC/DC converter in the embodiments of this application.

FIG. 5 shows a control method of a bi-directional DC/DC converter in some embodiments of this application, which is used in a main control module of the bi-directional DC/DC converter in any of the above embodiments. The control method of a bi-directional DC/DC converter includes the following steps:

S201, obtaining a first voltage value output by a first rectifier module in a current control cycle;

S202, obtaining a second voltage value output by a second rectifier module in the current control cycle, where a source terminal transmits electric energy to a destination terminal sequentially through the first rectifier module and the second rectifier module;

S203, calculating a theoretical voltage control quantity of the bi-directional DC/DC converter in the current control cycle based on a preset reference voltage value and the second voltage value; and S204, setting an actual output voltage of the bi-directional DC/DC converter in a next control cycle based on the theoretical voltage control quantity and the first voltage value.

In step S201, the first voltage value may be obtained as follows: a first sampling unit samples a voltage at a corresponding node and conducts an A/D conversion.

In step S202, the second voltage value may be obtained as follows: a second sampling unit samples a voltage at an output node of the second rectifier module and conducts an A/D conversion.

In step S203, a formula obtained through inference in the above embodiments may be used to calculate the theoretical voltage control quantity. The formula is as follows:

$$U_{c1\_off}(k)=[C_1 U_0(k) U_{ref} - C_1 U_0^2(k)*(1-T_S/R_L C1) - 4C_{oss}V_{in}^2]/(4C_1 V_{in}).$$

A theoretical voltage control quantity in the current control cycle that makes a voltage tracking error of the bi-directional DC/DC converter in the next control cycle minimized or relatively small is calculated. $U_{c1\_off}(k)$ is a theoretical voltage control quantity in the current control cycle, $C_1$ is a capacitance value of a first capacitor, and the first rectifier module is connected to the second rectifier module sequentially through a first capacitor and a transformer. $U_0(k)$ is a second voltage value in the current control cycle, $U_{ref}$ is a reference voltage value, $T_s$ is a duration of the control cycle, $V_{in}$ is a voltage value of a first direct current voltage, $C_{oss}$ is a parasitic capacitance value of a first switching transistor S1, a second switching transistor S2, a third switching transistor S3, and a fourth switching transistor S4, and $R_L$ is a resistance value of an output load resistor of the second rectifier module 102. The first switching transistor S1 and the third switching transistor S3 form the first bridge arm, and the second switching transistor S2 and the fourth switching transistor S4 form a second bridge arm.

In some embodiments, step S203 may include the following sub-steps: S1031, obtaining a first relation between a voltage control quantity of the current control cycle and a voltage control quantity of the next control cycle; S1032, setting an evaluation function of a tracking error based on the preset reference voltage and a voltage control quantity of the next control cycle; and S1033, calculating the theoretical voltage control quantity of the bi-directional DC/DC converter in the current control cycle based on a preset reference voltage value, the second voltage value, the first relation, and the evaluation function.

In step S1031, the first relation is the formula in the above embodiments:

$$U_0(k+1)=(1-T_S/R_L C_0)*U_0(k)+I_{out}(k)*T_S/C_0.$$

In step S1032, the evaluation function is the $J_{opt}=\{U_0(k+1)-U_{ref}\}^2$ in the above embodiments. When $J_{opt}$ is minimum, a minimum tracking error is obtained.

In step S1033, a preset calculation formula may be obtained based on the first relation and the evaluation function; and then the theoretical voltage control quantity that makes a voltage tracking error of the bi-directional DC/DC converter in the next control cycle minimized may be calculated based on the preset calculation formula, the second voltage value, and the preset reference voltage. The preset formula is as follows:

$$U_{c1\_off}(k)=[C_1 U_0(k) U_{ref} - C_1 U_0^2(k)*(1-T_S/R_L C1) - 4C_{oss}V_{in}^2]/(4C_1 V_{in}).$$

In step S204, an output switching signal is used to regulate switch-on and switch-off of each switching transistor of the first rectifier module, so as to achieve a purpose of regulating an actual output voltage in the next control cycle.

In some embodiments, step S204 may include: generating a switching signal based on the theoretical voltage control quantity and the first voltage value to control an actual output voltage of the bi-directional DC/DC converter in the next control cycle. The switching signal may be a single signal or a plurality of signals, thus controlling switch-on/switch-off of each switching transistor of the first rectifier module.

In some embodiments, the step of generating a switching signal based on the theoretical voltage control quantity and the first voltage value includes: comparing the theoretical voltage control quantity with the first voltage value to generate the switching signal, where the switching signal is used to be sent to a control terminal of the first rectifier module to control a first voltage value output by the first rectifier module in the next control cycle, so as to control an actual output voltage of the bi-directional DC/DC converter in the next control cycle.

Since the first rectifier module includes a first rectifier bridge and a second rectifier bridge, the control signal includes a first control signal and a second control signal.

Step S204 is specifically as follows: comparing the voltage control quantity with the first voltage value to obtain a first switching signal and a second switching signal for the next control cycle. The first switching signal is used to control switch-on and switch-off of an upper bridge arm of the first bridge arm and a lower bridge arm of the second bridge arm, and the second switching signal is used to control switch-on and switch-off of a lower bridge arm of the first bridge arm and an upper bridge arm of the second bridge arm. The upper bridge arm of the first bridge arm is a first switching transistor, the lower bridge arm of the first bridge arm is a third switching transistor, the upper bridge arm of the second bridge arm is a second switching transistor, and the lower bridge arm of the second bridge arm is a fourth switching transistor.

When the first voltage value is in a first interval, in the next control cycle, the upper bridge arm of the first bridge arm and the lower bridge arm of the second bridge arm are switched on, and the lower bridge arm of the first bridge arm and the upper bridge arm of the second bridge arm are switched off. When the first voltage value is in a second interval in the current control cycle, in the next control cycle, the upper bridge arm of the first bridge arm and the lower bridge arm of the second bridge arm are switched off, and the lower bridge arm of the first bridge arm and the upper bridge arm of the second bridge arm are switched on.

The first voltage value includes a valley value $V_{11}$ and a peak value $V_{22}$ in each control cycle. The first interval is a combination of $(-U_{c1\_off}, V_{11}]$ and $[V_{11}, U_{c1\_off})$; and the second interval is a combination of $[V_{22}, -U_{c1\_off})$ and $(U_{c1\_off}, V_{22}]$, and $U_{c1\_off}$ is a theoretical voltage control quantity.

It can be learned from the above that, according to the control method for a bi-directional DC/DC converter provided in the embodiments of this application, a first voltage value output by a first rectifier module in the current control cycle is obtained; a second voltage value output by a second rectifier module in the current control cycle is obtained, where a source terminal transmits electric energy to the destination terminal sequentially through the first rectifier module and the second rectifier module; a theoretical voltage control quantity of the bi-directional DC/DC converter in the current control cycle is calculated based on a preset reference voltage value and the second voltage value; and an actual output voltage of the bi-directional DC/DC converter in a next control cycle is set based on the theoretical voltage control quantity and the first voltage value, so that a beneficial effect of reducing a voltage tracking error in the next control cycle is achieved, and an extremely fast dynamic response may be received in all working conditions.

Figure 6:
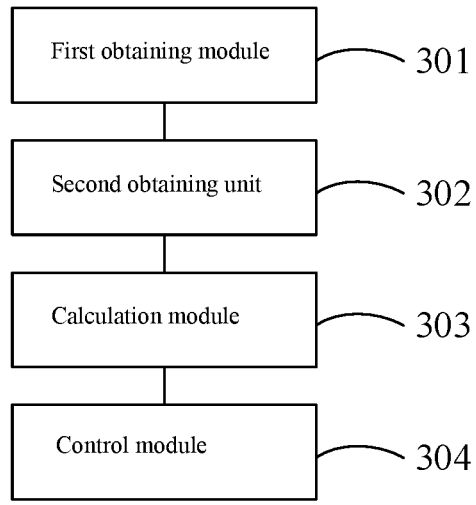
FIG. 6 is a structural diagram of a control apparatus of a bi-directional DC/DC converter in the embodiments of this application.

FIG. 6 is a structural diagram of a control apparatus of a bi-directional DC/DC converter in some embodiments of this application. The apparatus includes a first obtaining module 301, a second obtaining module 302, a calculation module 303, and a control module 304.

The first obtaining module 301 is configured to obtain a first voltage value output by a first rectifier module in the current control cycle; and the first voltage value may be obtained as follows: a first sampling unit samples a voltage at a corresponding node and conducts an A/D conversion.

The second obtaining module 302 is configured to obtain a second voltage value output by a second rectifier module in the current control cycle. A source terminal transmits electric energy to a destination terminal sequentially through the first rectifier module and the second rectifier module. The second voltage value may be obtained as follows: a second sampling unit samples a voltage at an output node of the second rectifier module and conducts an A/D conversion The calculation module 303 is configured to calculate a theoretical voltage control quantity of the bi-directional DC/DC converter in the current control cycle based on a preset reference voltage value and the second voltage value, to reduce a voltage tracking error in the next control cycle. The theoretical voltage control quantity may be calculated by a formula obtained through inference in the above embodiments. The formula is as follows:

$$U_{c1\_off}(k)=[C_1U_0(k)U_{ref}-C_1U_0^2(k)*(1-T_S/R_LC1)-4C_{oss}V_{in}^2]/(4C_1V_{in}).$$

A theoretical voltage control quantity in the current control cycle that makes a voltage tracking error of the bi-directional DC/DC converter in the next control cycle minimized or relatively small is calculated. $U_{c1\_off}(k)$ is a theoretical voltage control quantity in the current control cycle, $C_1$ is a capacitance value of a first capacitor, and the first rectifier module is connected to the second rectifier module sequentially through a first capacitor and a transformer. $U_0(k)$ is a second voltage value in the current control cycle, $U_{ref}$ is a reference voltage value, $T_s$ is a duration of the control cycle, $V_{in}$ is a voltage value of a first direct current voltage, $C_{oss}$ is a parasitic capacitance value of a first switching transistor S1, a second switching transistor S2, a third switching transistor S3, and a fourth switching transistor S4, and $R_L$ is a resistance value of an output load resistor of the second rectifier module 102. The first switching transistor S1 and the third switching transistor S3 form the first bridge arm, and the second switching transistor S2 and the fourth switching transistor S4 form a second bridge arm.

The control module 304 is configured to set an actual output voltage of the bi-directional DC/DC converter in the next control cycle based on the theoretical voltage control quantity and the first voltage value. An output switching signal is used to regulate switch-on and switch-off of each switching transistor of the first rectifier module, so as to achieve a purpose of regulating an actual output voltage in the next control cycle.

In some embodiments, the control module 304 is configured to generate a switching signal based on the theoretical voltage control quantity and the first voltage value to control an actual output voltage of the bi-directional DC/DC converter in the next control cycle. The switching signal may be a single signal or a plurality of signals, thus controlling switch-on/switch-off of each switching transistor of the first rectifier module.

In some embodiments, the step of generating a switching signal based on the theoretical voltage control quantity and the first voltage value includes: comparing the theoretical voltage control quantity with the first voltage value to generate the switching signal, where the switching signal is used to be sent to a control terminal of the first rectifier module to control a first voltage value output by the first rectifier module in the next control cycle, so as to control an actual output voltage of the bi-directional DC/DC converter in the next control cycle.

Since the first rectifier module includes a first rectifier bridge and a second rectifier bridge, the control signal includes a first control signal and a second control signal.

The control module 304 is configured to compare the voltage control quantity with the first voltage value to obtain a first switching signal and a second switching signal for the next control cycle. The first switching signal is used to control switch-on and switch-off of an upper bridge arm of the first bridge arm and a lower bridge arm of the second bridge arm, and the second switching signal is used to control switch-on and switch-off of a lower bridge arm of the first bridge arm and an upper bridge arm of the second bridge arm. The upper bridge arm of the first bridge arm is a first switching transistor, the lower bridge arm of the first bridge arm is a third switching transistor, the upper bridge arm of the second bridge arm is a second switching transistor, and the lower bridge arm of the second bridge arm is a fourth switching transistor.

When the first voltage value is in a first interval, in the next control cycle, the upper bridge arm of the first bridge arm and the lower bridge arm of the second bridge arm are switched on, and the lower bridge arm of the first bridge arm and the upper bridge arm of the second bridge arm are switched off. When the first voltage value is in a second interval in the current control cycle, in the next control cycle, the upper bridge arm of the first bridge arm and the lower bridge arm of the second bridge arm are switched off, and the lower bridge arm of the first bridge arm and the upper bridge arm of the second bridge arm are switched on.

The first voltage value includes a valley value $V_{11}$ and a peak value $V_{22}$ in each control cycle. The first interval is a combination of $(-U_{c1\_off}, V_{11}]$ and $[V_{11}, U_{c1\_off})$; and the second interval is a combination of $[V_{22}, -U_{c1\_off})$ and $(U_{c1\_off}, V_{22}]$, and $U_{c1\_off}$ is a theoretical voltage control quantity.

It can be learned from the above that, according to the control apparatus of a bi-directional DC/DC converter provided in the embodiments of this application, a first voltage value output by a first rectifier module in the current control cycle is obtained; a second voltage value output by a second rectifier module in the current control cycle is obtained, where a source terminal transmits electric energy to a destination terminal sequentially through the first rectifier module and the second rectifier module; a theoretical voltage control quantity of the bi-directional DC/DC converter in the current control cycle is calculated based on a preset reference voltage value and the second voltage value; and an actual output voltage of the bi-directional DC/DC converter in a next control cycle is set based on the theoretical voltage control quantity and the first voltage value, so that a beneficial effect of reducing the voltage tracking error in the next control cycle is achieved, and an extremely fast dynamic response may be received in all working conditions.

Figure 7:
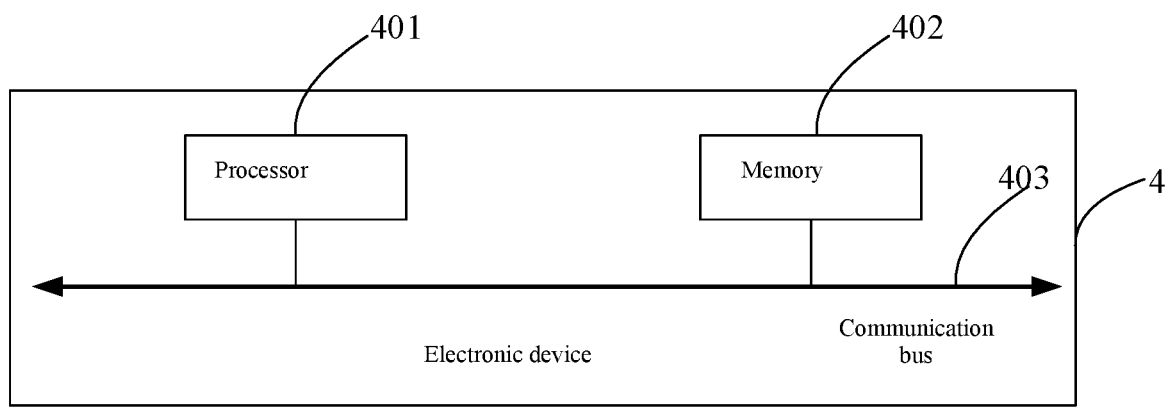
FIG. 7 is a structural diagram of an electronic device in the embodiments of this application.

FIG. 7 is a schematic structural diagram of an electronic device provided in the embodiments of this application. This application provides an electronic device 4, including: a processor 401 and a memory 402. The processor 401 and the memory 402 are interconnected and communicated with each other through a communication bus 403 and/or another form of connection mechanism (not shown). The memory 402 stores a computer program executable on the processor 401. When a calculation device is running, the processor 401 executes the computer program so as to implement the method in any of the optional implementations in the above embodiments.

The embodiments of this application provide a storage medium. When the computer program is executed by a processor, a method in any of the optional implementations of above embodiment is implemented. The storage medium may be any type of volatile or non-volatile storage device or a combination thereof such as a static random access memory (Static Random Access Memory, SRAM for short), an electrically erasable programmable read-only memory (Electrically Erasable Programmable Read-Only Memory, EEPROM for short), an erasable programmable read only memory (Erasable Programmable Read Only Memory, EPROM for short), a programmable read-only memory (Programmable Red-Only Memory, PROM for short), a read-only memory (Read-Only Memory, ROM for short), a magnetic memory, a flash memory, a magnetic disk or a compact disk.

Finally, it should be noted that the foregoing embodiments are merely used to describe the technical solutions of this application, but are not limited thereto. Although this application is described in detail with reference to the foregoing embodiments, a person of ordinary skill in the art should understand that the technical solutions recorded in the foregoing embodiments may still be modified, or equivalently replace some or all technical features. However, these modifications or replacements do not make the essence of the corresponding technical solutions go beyond the scope of the technical solutions of the embodiments of this application, and may fall within the scope of claims and specification of this application. In particular, as long as there is no structural conflict, the various technical features mentioned in the embodiments can be combined in any manner. This application is not limited to the specific embodiments disclosed herein, but includes all technical solutions falling within the scope of the claims.

What is claimed is:

1. A control method for a bi-directional DC/DC converter, comprising:
   obtaining a first voltage value output by a first rectifier module of the bi-directional DC/DC converter in a current control cycle;
   obtaining a second voltage value output by a second rectifier module of the bi-directional DC/DC converter in the current control cycle;
   calculating a theoretical voltage control quantity of the bi-directional DC/DC converter in the current control cycle based on a preset reference voltage value and the second voltage value; and
   setting an actual output voltage of the bi-directional DC/DC converter in a next control cycle based on the theoretical voltage control quantity and the first voltage value;
   wherein a source terminal transmits electric energy to a destination terminal sequentially through the first rectifier module and the second rectifier module; and
   wherein calculating the theoretical voltage control quantity of the bi-directional DC/DC converter in the current control cycle based on the preset reference voltage value and the second voltage value comprises:
   obtaining a relation between a voltage control quantity of the current control cycle and a voltage control quantity of the next control cycle;
   setting an evaluation function of tracking error based on the preset reference voltage value and the voltage control quantity of the next control cycle; and
   calculating the theoretical voltage control quantity of the bi-directional DC/DC converter in the current control cycle based on the preset reference voltage value, the second voltage value, the relation, and the evaluation function.

2. The method according to claim 1, wherein setting the actual output voltage of the bi-directional DC/DC converter in the next control cycle based on the theoretical voltage control quantity and the first voltage value comprises:
   generating a switching signal based on the theoretical voltage control quantity and the first voltage value to control the actual output voltage of the bi-directional DC/DC converter in the next control cycle.

3. The method according to claim 2, wherein generating the switching signal based on the theoretical voltage control quantity and the first voltage value comprises:
   comparing the theoretical voltage control quantity with the first voltage value to generate the switching signal, wherein the switching signal is to be sent to a control terminal of the first rectifier module to regulate the first voltage value output by the first rectifier module in the next control cycle, so as to control the actual output voltage of the bi-directional DC/DC converter in the next control cycle.

4. The method according to claim 1, wherein setting the actual output voltage of the bi-directional DC/DC converter in the next control cycle based on the theoretical voltage control quantity and the first voltage value comprises:
   outputting the theoretical voltage control quantity and the first voltage value to a hysteresis comparator for comparison to generate a switching signal, wherein the switching signal is to be sent to a control terminal of the first rectifier module to regulate the first voltage value output by the first rectifier module in the next control cycle, so as to control the actual output voltage of the bi-directional DC/DC converter in the next control cycle.

5. The method according to claim 1, wherein:
   the first rectifier module comprises a first bridge arm and a second bridge arm; and
   setting the actual output voltage of the bi-directional DC/DC converter in the next control cycle based on the theoretical voltage control quantity and the first voltage value comprises:
   comparing the theoretical voltage control quantity with the first voltage value to obtain a first switching signal and a second switching signal for the next control cycle, wherein the first switching signal is used to control switch-on and switch-off of an upper bridge arm of the first bridge arm and a lower bridge arm of the second bridge arm, and the second switching signal is used to control switch-on and switch-off of a lower bridge arm of the first bridge arm and an upper bridge arm of the second bridge arm.

6. The method according to claim 5, wherein:
   in response to the first voltage value being in a first interval in the current control cycle, in the next control cycle, the upper bridge arm of the first bridge arm and the lower bridge arm of the second bridge arm are switched on, and the lower bridge arm of the first bridge arm and the upper bridge arm of the second bridge arm are switched off; and in response to the first voltage value being in a second interval in the current control cycle, in the next control cycle, the upper bridge arm of the first bridge arm and the lower bridge arm of the second bridge arm are switched off, and the lower bridge arm of the first bridge arm and the upper bridge arm of the second bridge arm are switched on.

7. The method according to claim 6, wherein:
the first voltage value comprises a valley value $V_{11}$ and a peak value $V_{22}$ in each control cycle;
a change of the first voltage value in the first interval is that the first voltage value decreases from $-U_{c1\_off}$ to $V_{11}$ and increases from $V_{11}$ to $U_{c1\_off}$; and
a change of the first voltage value in the second interval is that the first voltage value increases from $U_{c1\_off}$ to $V_{22}$ and decreases from $V_{22}$, to $-U_{c1\_off}$; and
$U_{c1\_off}$ is the theoretical voltage control quantity.

8. The method according to claim 1, wherein calculating the theoretical voltage control quantity of the bi-directional DC/DC converter in the current control cycle based on the preset reference voltage value, the second voltage value, the relation, and the evaluation function comprises:
obtaining a preset calculation formula based on the relation and the evaluation function; and
calculating, based on the preset calculation formula, the second voltage value, and the preset reference voltage, the theoretical voltage control quantity that minimizes a voltage tracking error of the bi-directional DC/DC converter in the next control cycle.

9. The method according to claim 1, wherein the calculating the theoretical voltage control quantity of the bi-directional DC/DC converter in the current control cycle based on the preset reference voltage value and the second voltage value comprises:
calculating, according to formula $U_{c1\_off}(k)=[C_1 U_0(k) U_{ref} - C_1 U_0^2(k)*(1-T_s/R_L C_1) - 4C_{oss} V_{in}^2]/(4C_1 V_{in})$, the theoretical voltage control quantity that minimizes a voltage tracking error of the bi-directional DC/DC converter in the next control cycle, wherein
$U_{c1\_off}(k)$ is the theoretical voltage control quantity in the current control cycle,
$C_1$ is a capacitance value of a capacitor, and the first rectifier module is connected to the second rectifier module through the capacitor,
$U_0(k)$ is the second voltage value in the current control cycle,
$U_{ref}$ is the reference voltage value,
$T_s$ is a duration of the control cycle,
$V_{in}$ is the first voltage value,
$C_{oss}$ is a parasitic capacitance value of a first switching transistor, a second switching transistor, a third switching transistor, and a fourth switching transistor, the second switching transistor and the third switching transistor form a first bridge arm of the first rectifier module, and the first switching transistor and the fourth switching transistor form a second bridge arm of the first rectifier module, and
$R_L$ is a resistance value of an output load resistor of the second rectifier module.

10. A storage medium, storing a computer program that, when executed by a processor, causes the processor to implement the method according to claim 1.

11. A bi-directional DC/DC converter, comprising:
a first rectifier module, configured to convert a first direct current into a first alternating current for outputting;
a transformer, a primary side of the transformer being connected to the first rectifier module through a first capacitor to receive the first alternating current, and a secondary side of the transformer outputting a second alternating current;
a second rectifier module, configured to be connected to the secondary side to rectify the second alternating current to obtain a second direct current for outputting; and
a control module, configured to:
be connected to each of an output terminal of the second rectifier module and an input terminal of the first capacitor to obtain a first voltage value output by the first rectifier module and a second voltage value of the second rectifier module in a current control cycle;
obtain a relation between a voltage control quantity of the current control cycle and a voltage control quantity of the next control cycle, set an evaluation function of tracking error based on a preset reference voltage value and the voltage control quantity of the next control cycle, and calculate a theoretical voltage control quantity of the bi-directional DC/DC converter in the current control cycle based on the preset reference voltage value, the second voltage value, the relation, and the evaluation function, to reduce a voltage tracking error in a next control cycle; and
set an actual output voltage of the second rectifier module in the next control cycle based on the theoretical voltage control quantity and the first voltage value.

12. The bi-directional DC/DC converter according to claim 11, wherein the control module comprises:
a first sampling unit, configured to be connected to the first capacitor and the first rectifier module to obtain the first voltage value;
a second sampling unit, configured to be connected to the output terminal of the second rectifier module to obtain the second voltage value;
a predictive controller, configured to be connected to the second sampling unit to calculate the theoretical voltage control quantity in the current control cycle based on the reference voltage value and the second voltage value, so as to reduce the voltage tracking error in the next control cycle; and
a comparator unit, configured to be connected to the first sampling unit and the predictive controller to compare the theoretical voltage control quantity with the first voltage value to obtain a comparison result, generate a switching signal based on the comparison result, and send the switching signal to a control terminal of the first rectifier module.

13. The bi-directional DC/DC converter according to claim 12, wherein the comparator unit is a hysteresis comparator.

14. The bi-directional DC/DC converter according to claim 11, wherein:
the first rectifier module comprises a first switching transistor, a second switching transistor, a third switching transistor, and a fourth switching transistor;
the first switching transistor and the third switching transistor form a first bridge arm;
the second switching transistor and the fourth switching transistor form a second bridge arm;
an input terminal of the first switching transistor and an input terminal of the second switching transistor are connected to each other for connecting to a positive electrode of a source terminal;

an output terminal of the third switching transistor and an output terminal of the fourth switching transistor are connected to each other for connecting to a negative electrode of the source terminal;

an output terminal of the first switching transistor and an input terminal of the third switching transistor are connected to each other and connected to a positive terminal at the primary side of the transformer through the first capacitor;

an output terminal of the second switching transistor and an input terminal of the fourth switching transistor are connected to each other and connected to a negative terminal at the primary side of the transformer; and the control module is connected to a control terminal of each of the first switching transistor, the second switching transistor, the third switching transistor, and the fourth switching transistor.

15. The bi-directional DC/DC converter according to claim 14, wherein:

in response to the first voltage value being in a first interval in the current control cycle, in the next control cycle, the first switching transistor and the fourth switching transistor are switched on, and the second switching transistor and the third switching transistor are switched off; and in response to the first voltage value being in a second interval in the current control cycle, in the next control cycle, the first switching transistor and the fourth switching transistor are switched off, and the second switching transistor and the third switching transistor are switched on.

16. The bi-directional DC/DC converter according to claim 15, wherein:

the first voltage value comprises a valley value $V_{11}$ and a peak value $V_{22}$ in each control cycle;

a change of the first voltage value in the first interval is that the first voltage value decreases from $-U_{c1\_off}$ to $V_{11}$ and increases from $V_{11}$ to $U_{c1\_off}$;

a change of the first voltage value in the second interval is that the first voltage value increases from $U_{c1\_off}$ to $V_{22}$ and decreases from $V_{22}$ to $-U_{c1\_off}$; and $U_{c1\_off}$ is a theoretical voltage control quantity.

17. The bi-directional DC/DC converter according to claim 14, wherein the theoretical voltage control quantity satisfies following:

$U_{c1\_off}(k) = [C_1 U_0(k) U_{ref} - C_1 U_0^2(k)*(1-T_s/R_L C_1) - 4C_{oss} V_{in}^2]/(4C_1 V_{in})$, which is used to calculate the theoretical voltage control quantity in the current control cycle that minimizes a voltage tracking error of the bi-directional DC/DC converter in the next control cycle;

wherein:

$U_{c1\_off}(k)$ is the theoretical voltage control quantity in the current control cycle, $C_1$ is a capacitance value of the first capacitor, and the first rectifier module is connected to the second rectifier module through the first capacitor, $U_0(k)$ is the second voltage value in the current control cycle, $U_{ref}$ is the reference voltage value, $T_s$ is a duration of the control cycle, $V_{in}$ is a voltage value of the direct current voltage, $C_{oss}$ is a parasitic capacitance value of the first switching transistor, the second switching transistor, the third switching transistor, and the fourth switching transistor, and $R_L$ is a resistance value of an output load resistor of the second rectifier module.

18. A control apparatus for a bi-directional DC/DC converter, comprising:

a processor; and a memory storing a computer program that, when executed by the processor, causes the processor to:

obtain a first voltage value output by a first rectifier module of the DC/DC converter in a current control cycle;

obtain a second voltage value output by a second rectifier module of the DC/DC converter in the current control cycle;

obtain a relation between a voltage control quantity of the current control cycle and a voltage control quantity of the next control cycle, set an evaluation function of tracking error based on a preset reference voltage value and the voltage control quantity of the next control cycle, and calculate a theoretical voltage control quantity of the bi-directional DC/DC converter in the current control cycle based on the preset reference voltage value, the second voltage value, the relation, and the evaluation function; and set an actual output voltage of the bi-directional DC/DC converter in a next control cycle based on the theoretical voltage control quantity and the first voltage value;

wherein a source terminal transmits electric energy to a destination terminal sequentially through the first rectifier module and the second rectifier module.

19. The apparatus according to claim 18, wherein the computer program further causes the processor to:

generate a switching signal based on the theoretical voltage control quantity and the first voltage value to control the actual output voltage of the bi-directional DC/DC converter in the next control cycle.

* * * * *